Dec. 20, 1949  H. S. KELLY, JR  2,492,098
SEPARATION PROCESS
Filed June 15, 1946
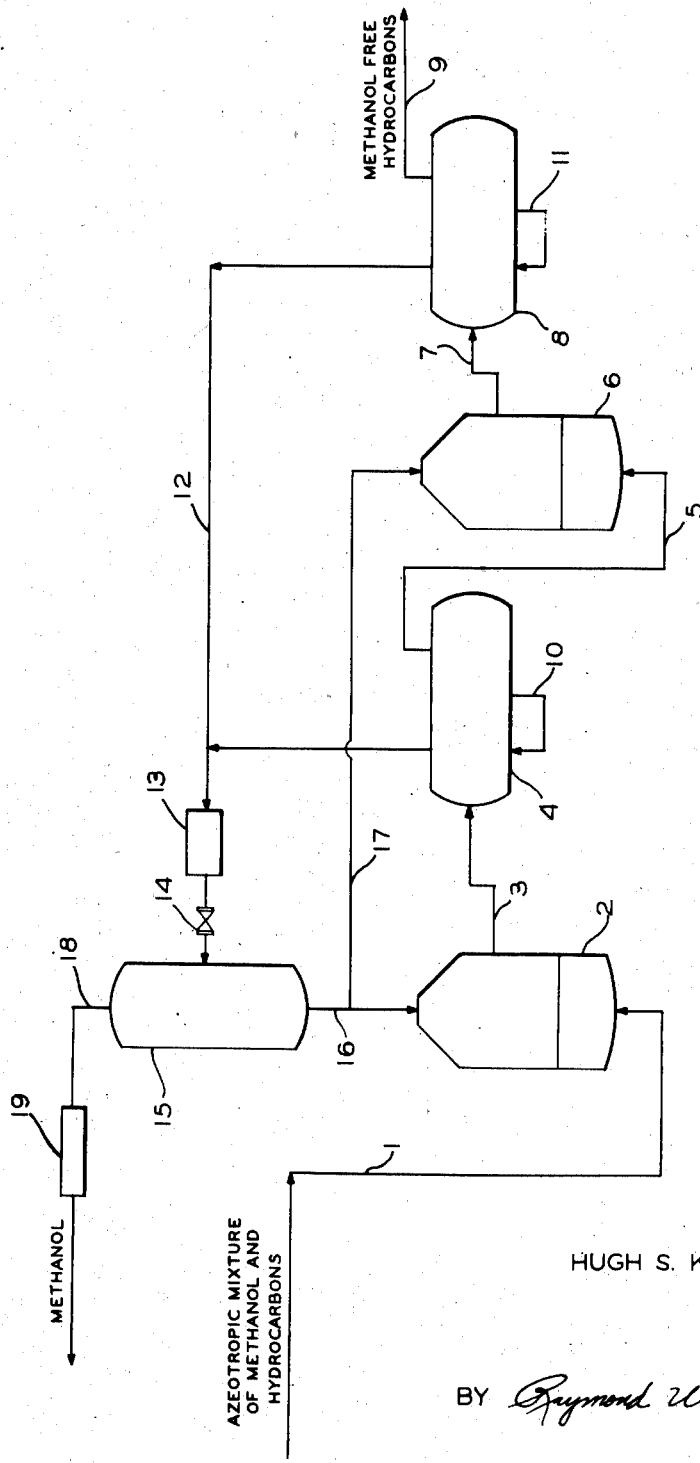
HUGH S. KELLY, JR.
INVENTOR
BY Raymond W. Barclay
AGENT Patented Dec. 20, 1949

2,492,098

UNITED STATES PATENT OFFICE 2,492,098

SEPARATION PROCESS

Hugh S. Kelly, Jr., Haddon Heights, N. J., assignor to Socony-Vacuum Oil Company, Incorporated, a corporation of New York Application June 15, 1946, Serial No. 677,066

12 Claims. (Cl. 260—465.1)

This invention relates to a process for separating hydrocarbons from admixtures with liquid treating agents used in the refining thereof and, more particularly, is concerned with a continuous method for effecting the recovery of said treating agents.

An auxiliary step to many processes such as azeotropic distillation and solvent extraction is the recovery of the added solvent or azeotropic agent from one or both of the phases into which the feed mixture has been separated. The simplest method of accomplishing this is by a distillation or stripping operation where such means are feasible. However, recovery by distillation is often very difficult and costly, particularly in cases where the boiling point of the solvent or azeotropic agent is proximate to that of the mixture being treated. In other instances, separation by distillation is impossible where the mixture is an azeotropic mixture or is impractical because a large amount of material must be heated to a high temperature to effect the removal of only a small proportion of solvent contained in the mixture. Other methods of recovering solvents, azeotropic agents and the like, hereinafter referred to as treating agents, comprise variations of a solvent extraction operation with another solvent or azeotropic agent. Even the simplest of such methods, for example, the use of water as an additional solvent to recover methanol from hydrocarbon azeotropes requires a relatively complex system of solvent extraction columns and distillation towers for separating the resulting mixture of the two solvents.

Other methods of separating mixtures of treating agents and hydrocarbons which have been employed include the addition to said mixture of organic liquids to effect a phase separation between the treating agent and the hydrocarbon components of the mixture. Such methods have the disadvantage of requiring subsequent distillation to separate the resultant liquid mixtures and oftentimes are encumbered by the formation of secondary azeotropes between the liquid additive and the treating agent or hydrocarbon components of the original mixture.

It is an object of the present invention to provide a process for separation of a liquid mixture of hydrocarbon and treating agent into its components to produce a hydrocarbon substantially free of treating agent and to yield a substantially quantitative recovery of the treating agent in a form in which it may be re-used. A further object is to provide a continuous method for effecting said separation which will be economical to operate without necessitating the use of high temperatures or relatively complex systems such as have heretofore been employed. A very important object of the present invention is the provision of a method for separating liquid mixtures of hydrocarbons and treating agents without the formation of secondary azeotropes due to the presence of liquid additives to the mixture for the purpose of effecting a phase separation between the components of the mixture.

These and other objects which will be apparent to those skilled in the art are accomplished in accordance with the present invention by contacting the liquid mixture of hydrocarbons and treating agent to be separated with a solid inorganic compound soluble in the treating agent and substantially insoluble in the hydrocarbon components, thereby effecting the formation of two immiscible phases. One phase is composed primarily of the treating agent containing dissolved compound and the other consists chiefly of the hydrocarbon components of the original mixture. The two immiscible phases are separated. Thereafter, the separated phase of treating agent containing dissolved compound is in turn separated into its components. The compound and treating agent so recovered are in a substantially pure form suitable for re-use.

The invention may be understood more fully by reference to the accompanying drawing, which is a flow sheet illustrating a preferred embodiment of the continuous separation method. For convenience, the process shown is the use of zinc chloride to separate and recover methanol from its azeotrope with saturated hydrocarbons such as occurs in the recovery of toluene by azeotropic distillation. It is to be understood, however, that the invention may be used in connection with other treating agents or with other suitable inorganic compounds. Referring now to the drawing, an azeotropic mixture of methanol and hydrocarbons is introduced through conduit 1 to the bottom of a vessel 2 containing a bed of zinc chloride. The liquid azeotropic mixture becomes saturated with zinc chloride by passage through the bed of salt and is conducted through outlet 3 to a settling tank 4 where the formation of two immiscible layers takes place. The upper phase consists substantially of all the hydrocarbon present in the original mixture plus a minor proportion, usually less than 1 per cent by volume of methanol. The upper layer is continuously removed through outlet 5 and conducted to the bottom of a second vessel 6 containing zinc chloride. The liquid mixture flows upward through this second bed of salt and is conducted through outlet 7 to a settling tank 8 where again the formation of two immiscible layers takes place. The upper layer is continuously removed through outlet 9 and consists of the hydrocarbon component of the original mixture free of methanol.

The lower phases in settling tanks 4 and 8 consist substantially of the methanol present in the original feed mixture saturated with zinc chloride. The methanol and salt may be separated by any convenient method. A preferred embodiment of the invention, however, is as shown, the removal of these lower phases from tanks 4 and 8 through outlets 10 and 11, respectively, and combining the phases so separated in conduit 12. The methanol-salt solution is then conducted into heater 13 and heated under sufficient pressure to maintain the solution in the liquid phase, thereafter releasing said pressure by control of valve 14 such that all of the methanol is flashed to vapor as it passes into vessel 15. The salt is recovered as a powder and falls through conduit 16 to the original contacting vessel 2 where it is re-used. A small amount of the recovered salt is withdrawn through conduit 17 and returned for re-use to vessel 6.

Methanol vapor is removed as overhead from vessel 15 through outlet 18 and passes through condenser 19 where it is condensed and is in a form suitable for re-use as azeotropic agent.

In general, the amount of zinc chloride or other salt employed will be such as to saturate the azeotropic mixture of methanol and hydrocarbons being separated. As a minimum amount, however, a quantity of salt must be present such that the treating agent containing said salt has a negligible solubility for the hydrocarbon components of the mixture.

If desired, the heat load on operation of the above described system can be reduced by lowering the amount of zinc chloride which must be heated and cooled by incomplete saturation of the methanol with zinc chloride in the first stage contacting vessel. This is shown by data tabulated below wherein methanol-free hydrocarbons leaving the second stage settling tank 8 are obtained when amounts as small as 28 per cent of the zinc chloride required for saturation is dissolved in contacting vessel 2. The advantage of saturating the methanol with zinc chloride is, however, shown by the fact that the hydrocarbon content of the recovered methanol decreases as the salt content of the solution increases, thus giving a more clear-cut separation of the feed mixture. The mixture, as separated below, was composed of 45 per cent by volume of a saturated hydrocarbon fraction having a boiling point range of 200 to 240° F. and 55 per cent by volume of methanol.

Zinc chloride used in first stage:

| | | | | | |
|---|---|---|---|---|---|
| Grams per liter of methanol | 200 | 300 | 400 | 500 | 728 |
| Per cent saturation | 28 | 41 | 55 | 69 | 100 |
| Products from first stage: | | | | | |
| Recovery of methanol in methanol layer, per cent of methanol charged | 99.2 | 99.1 | 99.2 | 99.3 | 99.7 |
| Hydrocarbon content of methanol layer, per cent volume | 12.0 | 9.1 | 7.7 | 5.8 | 2.1 |
| Recovery of hydrocarbon in hydrocarbon layer, per cent of hydrocarbon charged | 84 | 88 | 92 | 92 | 97 |
| Methanol content of hydrocarbon layer, per cent volume | 1.2 | 1.2 | 1.1 | 0.9 | 0.4 |
| Zinc chloride used in second stage | (1) | (1) | (1) | (1) | (1) |
| Products from second stage: | | | | | |
| Methanol content of hydrocarbons from second stage, per cent volume | 0 | 0 | 0 | 0 | 0 |

[1] Negligible.

Inorganic compounds other than zinc chloride may likewise be employed for the purpose of this invention. The requirements for such a compound are that it be appreciably soluble in the treating agent to be removed and insoluble in the hydrocarbon mixture as well as being chemically inert to both. Thus, in addition to the use of zinc chloride for separating the above methanol-hydrocarbon azeotropic mixture, other solid inorganic compounds, such as sodium iodide, sodium bromide, copper chloride, sodium hydroxide, potassium hydroxide, and the like might also be used. Preferably the compound employed will be a salt. For recovering selective solvents resulting from solvent extraction operations, such as the recovery of acetonitrile from acetonitrile-hydrocarbon mixtures, compounds suitable for effecting a separation of the phases include silver nitrate and sodium iodide.

Likewise, those in the art will recognize that other mixtures of hydrocarbons and solvents or azeotropic agents may be separated by contacting the mixture to be treated with a sufficient amount of a solid inorganic compound soluble in the treating agent and insoluble in the hydrocarbon components of the mixture, separating the resulting immiscible phases and thereafter separating the inorganic compound from the treating agent to yield said materials in substantially pure form suitable for re-use.

I claim:

1. A continuous method for separating an organic liquid mixture of a normally liquid hydrocarbon and an organic non-hydrocarbon liquid, which comprises contacting said mixture with a substance consisting of a solid material composed primarily of an inorganic compound soluble in said non-hydrocarbon, substantially insoluble in said hydrocarbon, chemically inert to both said non-hydrocarbon and said hydrocarbon and present in such quantity that a sufficient amount thereof dissolves in said non-hydrocarbon to effect the formation of a phase substantially immiscible with said hydrocarbon, separating said immiscible phase of non-hydrocarbon liquid containing dissolved compound from said hydrocarbon, heating said separated phase to a temperature sufficient to normally vaporize the non-hydrocarbon liquid, but under sufficient pressure to maintain the same as a liquid, releasing said pressure, thereby effecting vaporization of said non-hydrocarbon and yielding said inorganic compound as a residue, returning said compound to contact with the aforesaid mixture, and thereafter condensing said vaporized non-hydrocarbon to effect a substantial recovery thereof.

2. A continuous method for resolving an organic liquid azeotropic mixture of a normally liquid hydrocarbon and an organic non-hydrocarbon azeotrope-forming liquid, which comprises contacting said mixture with a substance consisting of a solid material composed primarily of an inorganic compound soluble in said non-hydrocarbon, substantially insoluble in said hydrocarbon, chemically inert to both said non-hydrocarbon and said hydrocarbon and present in such a quantity that a sufficient amount thereof dissolves in said non-hydrocarbon to effect the formation of a phase substantially immiscible with said hydrocarbon, separating said immiscible phase of non-hydrocarbon liquid containing dissolved compound from said hydrocarbon, heating the separated phase to a temperature sufficient to normally vaporize said non-hydrocarbon, but under sufficient pressure to maintain the same as a liquid, releasing said pressure, thereby effecting vaporization of said non-hydrocarbon and yielding said inorganic compound as a residue, returning said compound to contact with the aforesaid mixture, and thereafter condensing said vaporized non-hydrocarbon to effect a substantial recovery thereof.

3. A continuous method for recovering an organic non-hydrocarbon liquid having a selective solvent action for certain normally liquid hydrocarbons from a mixture of said hydrocarbons and said non-hydrocarbon, which comprises contacting said mixture with a substance consisting of a solid material composed primarily of an inorganic compound soluble in said non-hydrocarbon, substantially insoluble in said hydrocarbon, chemically inert to both said non-hydrocarbon and said hydrocarbon and present in such a quantity that a sufficient amount thereof dissolves in said non-hydrocarbon to effect the formation of a phase substantially immiscible with said hydrocarbon, separating said immiscible phase of non-hydrocarbon liquid containing dissolved compound from said hydrocarbon, heating the separated phase to a temperature sufficient to normally vaporize said non-hydrocarbon, but under sufficient pressure to maintain the same as a liquid, releasing said pressure, thereby effecting vaporization of said non-hydrocarbon and yielding said inorganic compound as a residue, returning said compound to contact with the aforesaid mixture, and thereafter condensing said vaporized non-hydrocarbon to effect a substantial recovery thereof.

4. A continuous method for separating an organic liquid mixture of a normally liquid hydrocarbon and an organic non-hydrocarbon liquid, which comprises passing said mixture through a bed of solid material consisting essentially of an inorganic compound soluble in said non-hydrocarbon, substantially insoluble in said hydrocarbon, chemically inert to both said non-hydrocarbon and said hydrocarbon and present in sufficient quantity to saturate said non-hydrocarbon, thereby effecting formation of a phase substantially immiscible with said hydrocarbon, separating said immiscible phase of non-hydrocarbon liquid containing dissolved compound from said hydrocarbon, heating said separated phase to a temperature sufficient to normally vaporize said non-hydrocarbon, but under sufficient pressure to maintain the same as a liquid, releasing said pressure, thereby effecting vaporization of said non-hydrocarbon, and yielding said inorganic compound as a residue, returning said compound to contact with the aforesaid mixture, and thereafter condensing said vaporized non-hydrocarbon to effect a substantial recovery thereof.

5. A continuous method for separating an organic liquid mixture of a normally liquid hydrocarbon and methanol, which comprises contacting said mixture with a substance consisting of a solid material composed primarily of an inorganic compound soluble in methanol, substantially insoluble in said hydrocarbon, chemically inert to both methanol and said hydrocarbon and present in such quantity that a sufficient amount thereof dissolves in the methanol to effect the formation of a phase substantially immiscible with said hydrocarbon, separating said immiscible phase of methanol containing dissolved inorganic compound from said hydrocarbon, heating said separated phase to a temperature sufficient to normally vaporize methanol, but under sufficient pressure to maintain the methanol as a liquid, releasing said pressure, thereby effecting vaporization of the methanol and yielding said compound as a residue, returning said compound to contact with the aforesaid mixture, and thereafter condensing said vaporized methanol to effect a substantial recovery thereof.

6. A continuous method for separating an organic liquid mixture of a normally liquid hydrocarbon and acetonitrile, which comprises contacting said mixture with a substance consisting of a solid material composed primarily of an inorganic compound soluble in acetonitrile, substantially insoluble in said hydrocarbon, chemically inert to both acetonitrile and said hydrocarbon and present in such quantity that a sufficient amount thereof dissolves in the acetonitrile to effect the formation of a phase substantially immiscible with said hydrocarbon, separating said immiscible phase of acetonitrile containing dissolved inorganic compound from said hydrocarbon, heating said separated phase to a temperature sufficient to normally vaporize acetonitrile, but under sufficient pressure to maintain the acetonitrile as a liquid, releasing said pressure, thereby effecting vaporization of the acetonitrile and yielding said compound as a residue, returning said compound to contact with the aforesaid mixture, and thereafter condensing said vaporized acetonitrile to effect a substantial recovery thereof.

7. A continuous method for separating an organic liquid mixture of a normally liquid hydrocarbon and methanol, which comprises contacting said mixture with a substance consisting of a solid material composed primarily of zinc chloride present in such quantity that a sufficient amount thereof dissolves in the methanol to effect the formation of a phase substantially immiscible with said hydrocarbon, separating said immiscible phase of methanol containing dissolved zinc chloride from said hydrocarbon, heating said separated phase to a temperature sufficient to normally vaporize methanol, but under sufficient pressure to maintain the methanol as a liquid, releasing said pressure, thereby effecting vaporization of the methanol and yielding zinc chloride as a residue, returning said zinc chloride to contact with the aforesaid mixture, and thereafter condensing said vaporized methanol to effect a substantial recovery thereof.

8. A continuous method for separating an organic liquid mixture of a normally liquid hydrocarbon and acetonitrile, which comprises contacting said mixture with a substance consisting of a solid material composed primarily of silver nitrate present in such quantity that a sufficient amount thereof dissolves in the acetonitrile to effect the formation of a phase substantially immiscible with said hydrocarbon, separating said immiscible phase of acetonitrile containing dissolved silver nitrate from said hydrocarbon, heating said separated phase to a temperature sufficient to normally vaporize acetonitrile, but under sufficient pressure to maintain the acetonitrile as a liquid, releasing said pressure, thereby effecting vaporization of the acetonitrile and yielding silver nitrate as a residue, returning said silver nitrate to contact with the aforesaid mixture, and thereafter condensing said vaporized acetonitrile to effect a substantial recovery thereof.

9. A method for separating an organic liquid mixture of a normally liquid hydrocarbon and an organic non-hydrocarbon liquid, which comprises contacting said mixture with a substance consisting of a solid material composed primarily of an inorganic compound soluble in said non-hydrocarbon, substantially insoluble in said hydrocarbon, chemically inert to both non-hydrocarbon and said hydrocarbon and present in such quantity that a sufficient amount thereof dissolves in said non-hydrocarbon to effect the formation of a phase substantially immiscible with said hydrocarbon, separating said immiscible phase of non-hydrocarbon liquid containing dissolved compound from said hydrocarbon, thereafter separating said phase into its components of non-hydrocarbon and inorganic compound, yielding a substantially quantitative recovery of said non-hydrocarbon liquid.

10. A method for resolving an organic liquid azeotropic mixture of a normally liquid hydrocarbon and an organic non-hydrocarbon azeotrope-forming liquid, which comprises contacting said mixture with a substance consisting of a solid material composed primarily of an inorganic compound soluble in said non-hydrocarbon, substantially insoluble in said hydrocarbon, chemically inert to both non-hydrocarbon and said hydrocarbon and present in such quantity that a sufficient amount thereof dissolves in said non-hydrocarbon to effect the formation of a phase substantially immiscible with said hydrocarbon, separating said immiscible phase of non-hydrocarbon liquid containing dissolved compound from said hydrocarbon, thereafter separating said phase into its components of non-hydrocarbon and inorganic compound, yielding a substantially quantitative recovery of said non-hydrocarbon liquid.

11. A method for recovering an organic non-hydrocarbon liquid having a selective solvent action for certain normally liquid hydrocarbons from a mixture of said hydrocarbons and said non-hydrocarbon, which comprises contacting said mixture with a substance consisting of a solid material composed primarily of an inorganic compound soluble in said non-hydrocarbon, substantially insoluble in said hydrocarbon, chemically inert to both non-hydrocarbon and said hydrocarbon and present in such quantity that a sufficient amount thereof dissolves in said non-hydrocarbon to effect the formation of a phase substantially immiscible with said hydrocarbon, separating said immiscible phase of non-hydrocarbon liquid containing dissolved compound from said hydrocarbon, thereafter separating said phase into its components of non-hydrocarbon and inorganic compound, yielding a substantially quantitative recovery of said non-hydrocarbon liquid.

12. A continuous method for separating an organic liquid mixture of a normally liquid hydrocarbon and an organic non-hydrocarbon liquid, which comprises flowing said mixture through a bed of solid material consisting essentially of an inorganic compound soluble in said non-hydrocarbon, substantially insoluble in said hydrocarbon, chemically inert to both said non-hydrocarbon and said hydrocarbon and present in such quantity that a sufficient amount thereof dissolves in said non-hydrocarbon to effect the formation of a phase substantially immiscible with said hydrocarbon, separating said immiscible phase of non-hydrocarbon liquid containing dissolved compound from said hydrocarbon, heating said separated phase to a temperature sufficient to normally vaporize said non-hydrocarbon, but under sufficient pressure to maintain the same as a liquid, releasing said pressure, thereby effecting vaporization of said non-hydrocarbon and yielding said compound as a residue in the vaporization chamber, returning said residue from said vaporization chamber overlying the original bed of inorganic compound by the gravitational fall thereto of said residue and thereafter condensing said vaporized non-hydrocarbon to effect a substantial recovery thereof.

HUGH S. KELLY, Jr.

REFERENCES CITED

The following references are of record in the file of this patent:

UNITED STATES PATENTS

| Number | Name | Date |
|---|---|---|
| 1,032,982 | Bergstrom et al. | July 16, 1912 |
| 1,585,042 | Mann et al. | May 18, 1926 |
| 2,133,691 | Francis | Oct. 18, 1938 |
| 2,246,257 | Kohn | June 17, 1941 |
| 2,246,376 | Lynch | June 17, 1941 |
| 2,280,264 | Reeves | Apr. 21, 1942 |
| 2,418,372 | Smith | Apr. 1, 1947 |

FOREIGN PATENTS

| Number | Country | Date |
|---|---|---|
| 367,538 | Germany | Jan. 23, 1923 |